Patented Nov. 2, 1926.

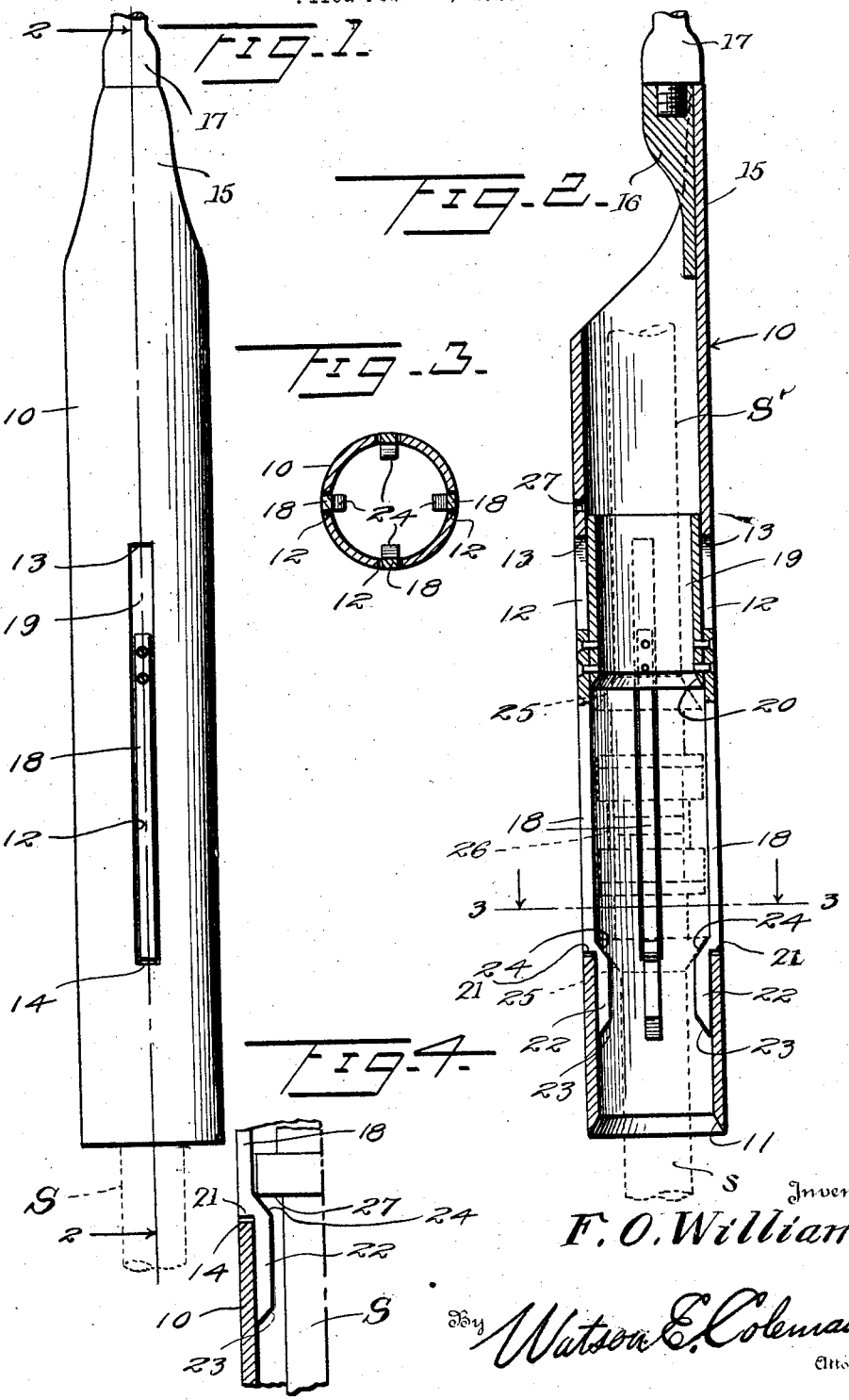

1,605,413

UNITED STATES PATENT OFFICE.

FREDERICK O. WILLIAMS, OF LONG BEACH, CALIFORNIA.

FISHING TOOL.

Application filed February 20, 1926. Serial No. 89,718.

This invention relates to fishing tools and more particularly to a fishing tool for use in withdrawing from wells the sucker rods employed for operating the pump.

An important object of the invention is to provide a fishing tool capable of use with sucker rods of different descriptions and which may be operated within a tube where the clearance afforded about the sucker rod is extremely small.

A further object of the invention is to provide a fishing tool of this character which may be employed for engaging sucker rods where the sucker rod is broken off intermediate its ends.

These and other objects I attain by the construction shown in the accompanying drawing, wherein for the purpose of illustration is shown a preferred embodiment of my invention and wherein:—

Figure 1 is a side elevation of a fishing tool constructed in accordance with my invention;

Figure 2 is a vertical sectional view therethrough on the line 2—2 of Figure 1 showing a sucker rod joint in position in the tool in dotted lines;

Figure 3 is a section on the line 3—3 of Figure 2;

Figure 4 is an enlarged detail sectional view showing a different type of sucker rod joint in position therein.

Referring now more particularly to the drawing, the tool includes a barrel 10, the lower end of which is beveled inwardly, as at 11, so that the sucker rod will be directed within the barrel. This barrel is formed with a plurality of circumferentially spaced vertically extending slots 12, the upper and lower faces of which are in the form of abrupt shoulders 13 and 14. The upper end of the barrel is open and has at one side a continuation 15 to which is welded or otherwise secured a box 16 adapted for engagement with a pin 17 of a sucker rod joint, by means of which the tool is lowered into the well.

Arranged within the barrel is a gripping element including spring fingers 18 corresponding in number and arrangement to the slots 12 and one arranged within each slot. The upper ends of these spring fingers are rigidly secured to a sleeve 19 slidably fitting the interior of the barrel, this sleeve having its lower face inwardly beveled, as at 20, for a purpose presently to appear. At their lower ends, each of the spring fingers is inwardly offset to provide an abrupt downwardly facing shoulder 21 and a locking portion 22 adapted to flatly abut the inner face of the barrel beneath the lower end of the slot when the spring finger is in its lowermost position. The lower end of this locking portion is inwardly beveled, as at 23, and the face of the internal shoulder formed by the offsetting of the finger is oppositely beveled, as at 24. The distance between the beveled faces is made slightly greater than the distance between opposite ends of the enlarged portions of two engaged sucker rods S and S'.

In the type of sucker rod illustrated in Figure 2, these enlarged portions at their connection to the rod have beveled faces 25 and between adjacent ends of the rod section is inserted a coupling 26. A second form of rod, illustrated in Figure 4, has instead of the beveled face 24, above described, an abrupt shoulder 27 and the coupling 26 is omitted.

In the use of the device, the fishing tool is lowered into the well until it comes into contact with the upper end of the broken rod. This rod may have been broken intermediate its ends, as illustrated, or the break may have occurred immediately adjacent or in the joint between the rods. Where the break occurs intermediate the ends of the rod, the rod is first guided into the barrel by the bevel 11 and then between the fingers 18 by the bevels 23. As the lowering of the fishing tool continues, the shoulder 25 or 27 of the rod comes into engagement with the lower beveled ends 23 of the fingers and since the enlarged portion of the rod is of greater diameter than the normal space between these fingers, the fingers, together with the sleeve 19, are caused to move upwardly in the slot. The length of the fingers 18 is slightly less than the length of the slot with the result that when their upper ends come into contact with the upper ends of the slots, the lower ends of the fingers are free to spread and permit passage of the shoulder, so that the joint between the sucker rod sections may pass between the beveled faces 24 and 25. The upper end of the rod passes through the open upper end of the barrel. When the joint comes into contact with the face 25, since it is of greater size than the bore of the sleeve, the downward movement of the fishing tool is checked and this is a signal to the operator to reverse movement of the tool. As the movement of the tool is reversed, the fingers 18, having sprung inwardly when the lower end of the joint passes the offset portions 22, the entire gripping unit moves downwardly as a body until the shoulders 21 of the spring fingers come into engagement with the end walls 14 of the slots and their downward movement is checked. The weight of the tool is then placed against the beveled faces 24 and against the lower ends of the slots through the shoulders 21. The tendency of the rod is to move downwardly by its own weight and to spread these fingers only at a point where the spreading action is resisted by the complete barrel with the result that a very firm grip upon the rod is obtained. When the rod has been withdrawn to the upper end of the well, it is simply necessary to lower the tool to a point where the upper ends of the fingers are again above the lower ends of the slots to secure the gripping element against movement and to again elevate the tool. The gripping element may be conveniently maintained against downward movement by providing in the wall thereof adjacent the upper ends of the slots a threaded opening 28 through which may be directed a set-screw for engagement with the sleeve 19.

While I am aware that tools have been previously devised employing spring fingers for gripping beneath the shoulders of a joint, all of these tools with which I am familiar place the weight of the supported tool upon the spring fingers instead of upon the barrel, as it is in the present construction and, therefore, these spring fingers must be made of considerable size and the tools may not be employed in a bore in which the sucker rod fits closely.

The tool being capable of a certain range of change and modification without materially departing from the spirit of the invention, I do not limit myself to the specific structure hereinbefore set forth except as hereinafter claimed.

I claim:—

1. In a fishing tool of the character described, an open topped barrel having at its lower end means for directing a fish into the interior thereof, the side wall of the barrel having circumferentially spaced vertically extending slots provided at their upper and lower ends with abrupt shoulders and a gripping element including spring fingers of less length than said slots located within the slots and having portions squarely confronting the shoulders at the ends of the slots and a member slidable within the barrel and to which the upper ends of the fingers are secured.

2. In a fishing tool of the character described, an open topped barrel having at its lower end means for directing a fish into the interior thereof, the side wall of the barrel having circumferentially spaced vertically extending slots provided at their upper and lower ends with abrupt shoulders and a gripping element including spring fingers of less length than said slots located within the slots and a sleeve slidable within the barrel and to which the upper ends of the fingers are secured, the lower ends of the fingers being inwardly offset to provide above such lower ends abrupt shoulders facing the lower ends of the slots, the extreme lower ends of the fingers being upwardly and inwardly beveled.

3. In a fishing tool of the character described, an open topped barrel having at its lower end means for directing a fish into the interior thereof, the side wall of the barrel having circumferentially spaced vertically extending slots provided at their upper and lower ends with abrupt shoulders and a gripping element including spring fingers of less length than said slots located within the slots and a sleeve slidable within the barrel and to which the upper ends of the fingers are secured, the lower ends of the fingers being inwardly offset to provide above such lower ends abrupt shoulders facing the lower ends of the slots, the extreme lower ends of the fingers being upwardly and inwardly beveled, said sleeve having an internal diameter less than the external diameter of the member to be grasped.

4. In a fishing tool of the character described, an open topped barrel having at its lower end means for directing a fish into the interior thereof, the side wall of the barrel having circumferentially spaced vertically extending slots provided at their upper and lower ends with abrupt shoulders and a gripping element including spring fingers of less length than said slots located within the slots and a sleeve slidable within the barrel and to which the upper ends of the fingers are secured, the lower ends of the fingers being inwardly offset to provide above such lower ends abrupt shoulders facing the lower ends of the slots, the extreme lower ends of the fingers being upwardly and inwardly beveled, said sleeve having an internal diameter less than the external diameter of the member to be grasped, the inner faces of the offset portions being normally spaced apart a distance less than the diameter of the tool to be grasped.

In testimony whereof I hereunto affix my signature.

FREDERICK O. WILLIAMS.